United States Patent [19]

Imoto et al.

[11] Patent Number: 5,716,732
[45] Date of Patent: Feb. 10, 1998

[54] ANODE MATERIAL AND METHOD OF MANUFACTURING THE SAME

[76] Inventors: Hiroshi Imoto, c/o Sony Corporation, 7-35, Kitashinagawa 6-chome, Shinagawa-ku, Tokyo; Atsuo Omaru, c/o Sony Energytec Inc., 22-3, Shibuya 2-chome, Shibuya-ku, Tokyo; Hideto Azuma, c/o Sony Corporation, 7-35, Kitashinagawa 6-chome, Shinagawa-ku, Tokyo; Yoshio Nishi, c/o Sony Corporation, 7-35, Kitashinagawa 6-chome, Shinagawa-ku, Tokyo; Yoshihisa Gonno, c/o Sony Corporation, 7-35, Kitashinagawa 6-chome, Shinagawa-ku, Tokyo; Masayuki Nagamine, c/o Sony Energytec Inc., 22-3, Shibuya 2-chome, Shibuya-ku, Tokyo, all of Japan

[21] Appl. No.: 812,734

[22] Filed: Mar. 6, 1997

Related U.S. Application Data

[62] Division of Ser. No. 507,324, Aug. 23, 1995, Pat. No. 5,643,426.

[51] Int. Cl.$^6$ ............................................. H01M 6/00
[52] U.S. Cl. ........................... 429/122; 429/218; 429/194
[58] Field of Search .................................. 429/122, 218, 429/194

[56] References Cited

U.S. PATENT DOCUMENTS

| | | | |
|---|---|---|---|
| 4,544,469 | 10/1985 | Boxall et al. | 204/294 |
| 5,306,415 | 4/1994 | Cornec et al. | 423/445 R |
| 5,344,726 | 9/1994 | Tanaka et al. | 423/445 R |
| 5,451,477 | 9/1995 | Omaru et al. | 429/218 |

FOREIGN PATENT DOCUMENTS

| | | |
|---|---|---|
| 58-93176 | 6/1983 | Japan . |
| 61-163562 | 7/1986 | Japan . |
| 282466 | 3/1990 | Japan . |
| 60-182670 | 9/1995 | Japan . |

*Primary Examiner*—Bruce F. Bell
*Attorney, Agent, or Firm*—Ronald P. Kananen

[57] ABSTRACT

An anode material consisting of non-graphitizable carbon material obtained by baking a carbon precursor is disclosed. In this non-graphitizable carbon material, a ratio by weight of carbon Ps in a stacking structure as determined from diffraction peak originating in a (002) crystal lattice plane and X-ray diffraction spectrum components on the lower angle side with respect to the diffraction peak originating in the (002) crystal lattice plane of X-ray diffraction spectrum is smaller than 0.59, or the stacking index SI thereof is smaller than 0.76. Moreover, an average number of carbon layers $n_{ave}$ in a stacking structure is smaller than 2.46. Alternatively, when the baking temperature is T°C. and the half width at half maximum of the peak appearing in the vicinity of 1340 cm$^{-1}$ in the Raman spectrum is HW, the condition expressed below is satisfied.

$$HW > 138 - 0.06 \cdot T$$

This non-graphitizable carbon material is manufactured by allowing the carbon precursor which becomes non-graphitizable carbon by baking to undergo heat treatment at a temperature 600° C. or more under an inactive gas atmosphere of flow rate of 0.1 ml/sec. or more per 1 g of carbon precursor, or to undergo heat treatment at a temperature 600° C. or more under an atmosphere of pressure less than 50 kPa. At this time, carbon precursor is mounted in a layered form so that the area in contact with the atmosphere is 10 cm$^2$ or more per 1 Kg.

3 Claims, 2 Drawing Sheets

ANODE MATERIAL AND METHOD OF MANUFACTURING THE SAME

This application is a division of application Ser. No. 08/507,324 filed Aug. 23, 1995 now U.S. Pat. No. 5,643,426.

TECHNICAL FIELD

This invention relates to an anode material used in a non-aqueous electrolyte secondary battery and for doping or undoping lithium, and a method of manufacturing such an anode material.

BACKGROUND ART

With miniaturization of electronic equipment, realization of a high energy density of a battery has been required. To meet with such requirement, various non-aqueous electrolyte batteries like a so-called lithium battery have been proposed.

However, e.g., in batteries using lithium metal as an anode, particularly in the case where such batteries are caused to be a secondary battery, there are the following drawbacks. Namely, (1) 5 to 10 hours are ordinarily required for charging, resulting in the fact that its quick charge characteristic is poor.

(2) Cycle life-time is short.

These drawbacks all result from the lithium metal itself, and are considered to be caused by a change of the lithium form, formation of lithium in a dendrite form and/or an irreversible change of lithium, and the like produced by repetition of charge/discharge operations.

In view of the above, as one technique for solving these problems, a method using carbonaceous material as an anode is proposed. This method utilizes the fact that a lithium carbon interlayer compound can be electrochemically formed with ease. For example, when a charge operation is carried out within a non-aqueous electrolyte in the state where carbon is used as an anode and a compound including lithium is used as a cathode, lithium in the cathode is electrochemically doped between layers of the anode carbon. The carbon into which lithium is doped in this way functions as a lithium electrode, and lithium in the anode is undoped from between carbon layers followed by discharge and is returned into the cathode.

We have demonstrated in the Japanese Patent Application Laid Open No. 252053/1991 publication that, as such carbonaceous material, non-graphitizable carbon material having spacing $d_{002}$ of a (002) plane of 3.70 angstroms or more, true density less than 1.70 g/cm$^3$, and no exothermic peak at 700° C. or more in the Differential Thermal Analysis (DTA) in air is excellent in a quantity of lithium doped/undoped (hereinafter simply referred to as lithium dope/undope quantity depending upon circumstances).

Meanwhile, in the above-described non-aqueous electrolyte secondary battery using carbonaceous material, current capacity (mAh/g) per unit weight of the anode is determined by a quantity of lithium-doped carbonaceous material. Accordingly, it is desirable that the lithium dope quantity is as great as possible as the carbonaceous material. Theoretically, a ratio of a single Li atom to six carbon atoms is an upper limit. When viewed from the above, while employment of the above-described carbonaceous material results in a great quantity of lithium being doped as compared to the conventional carbonaceous material, it cannot be said that even such carbonaceous material is sufficient.

DISCLOSURE OF THE INVENTION

An object of this invention is to provide an anode material which has a great quantity of doped lithium and is capable of sufficient current capacity, and a method of manufacturing such an anode material.

In order to attain the above-described object, as the result of the fact that the inventors of this invention repeatedly conducted studies for a long time, they have obtained findings that, in non-graphitizable carbon material, a ratio by weight of carbon in a stacking structure Ps, stacking index SI, and average number of carbon layers $n_{ave}$ in stacking structure are restricted so that a ratio (percentage) of the portion forming the stacked layer structure is caused to be small, and the half width at half maximum HW of peak in the vicinity of 1340 cm$^{-1}$ of a Raman spectrum is restricted, whereby an anode material having an extremely large capacity can be obtained. Further, they have found out that such carbonaceous material is produced by baking (firing) a carbon precursor under an atmosphere such that a volatile component produced in carbonization is removed to the outside of the reaction system.

The anode material of this invention has been completed on the basis of such findings, and is characterized in that this anode material is a non-graphitizable carbon material obtained by baking a carbon precursor, and a ratio by weight of carbon in a stacking structure Ps determined from diffraction peak originating in a (002) crystal lattice plane, and X-ray diffraction spectrum components on the lower angle side with respect to the diffraction peak originating in a (002) crystal lattice plane of an X-ray diffraction spectrum is less than 0.59, or a stacking index SI thereof is less than 0.76.

Moreover, the average number of carbon layers $n_{ave}$ in the stacking structure portion determined from diffraction peak plane originating in a (002) crystal lattice plane and X-ray diffraction spectrum components on the lower angle side with respect to the diffraction peak originating in a (002) crystal plane of X-ray diffraction spectrum is less than 2.46.

Further, the anode material of this invention is a non-graphitizable carbon material obtained by baking a carbon precursor, and when the baking temperature is T°C. and half width at half maximum of a peak appearing in the vicinity of 1340 cm$^{-1}$ in Raman spectrum is HW, the condition expressed below $$HW > 138 - 0.06 \cdot T$$

is satisfied.

Moreover, a method of manufacturing anode material of this invention is characterized in that a carbon precursor which becomes non-graphitizable carbon by baking is caused to undergo heat treatment at a temperature of 600° C. or more under the inactive gas atmosphere of flow rate of 0.1 ml/second or more per gram of carbon precursor.

Further, the method of this invention is characterized in that carbon precursor which becomes non-graphitizable carbon by baking is caused to undergo heat treatment at a temperature of 600° C. or more under the atmosphere of pressure less than 50 kPa.

Further, the method of this invention is characterized in that, in carrying out heat treatment of a carbon precursor, the carbon precursor is mounted in a layer form so that the area in contact with the atmosphere is 10 cm or more per 1 kg.

Non-graphitizable carbon material in which a ratio by weight of carbon in a stacking structure Ps, stacking index SI, and the average number of carbon layers $n_{ave}$ in the stacking structure, which are parameters reflecting the ratio (percentage) that carbon atoms take in a stacked layer structure in a non-graphitizable carbon material satisfy a predetermined condition which has a lithium dope quantity far greater than an ideal lithium dope quantity 372 mAh/g obtained on the assumption that when such carbon material is used as an anode material of lithium in a non-aqueous electrolyte battery, lithium is only doped between carbon layers of the stacked layer structure portion. It is considered that this is because non-graphitizable carbon material in which the above-mentioned parameters satisfy the predetermined condition has a large number of micro (very small) vacancies at sites where lithium is doped except for a carbon layer of the stacked layer structure portion.

Such non-graphitizable carbon material is obtained by carbonizing a carbon precursor which becomes non-graphitizable carbon by baking in an atmosphere where a volatile component produced in carbonization is removed to the outside of the system of the reaction such that heat treatment is conducted at a temperature of 600° C. or more under the inactive gas atmosphere of a flow rate of 0.1 ml/min or more per gram of carbon precursor, or under the atmosphere of pressure less than 50 kPa. This is based on the following reason.

Namely, when the carbon precursor is baked, low molecular paraffin, olefin, or low molecular aromatic family is volatilized from a temperature in the vicinity of 400° C., carbon dioxide, methane and carbon oxide are volatilized at about 600° C., and hydrogen is volatilized at a higher temperature. Volatilization of a low molecular compound at a lower temperature is based on cleavage of a carbon-oxygen bond, or carbon-carbon single bond in carbonaceous material. The carbonaceous material forms an olefin or aromatic ring having a more stable double bond. At a higher temperature, hydrogen is desorbed together with cleavage of the carbon-hydrogen bond. As a result, polymerization is developed, and an aromatic ring is grown. Elimination of a volatile component to the outside of a reaction system in such that the carbonization process promotes formation of vacancies along a diffusion path of the volatile component in carbon material particles. It is unknown that such vacancy forms an opened pore or a closed pore. However, it is estimated that a vacancy resulting from a diffusion of a molecule has a very small capacity. It is thus considered that such vacancy takes the structure which reasonably contributes to capacity.

As stated above, the anode material of this invention is non-graphitizable carbon material obtained by baking a carbon precursor, and weigh ratio Ps, stacking index SI and average number of carbon layers $n_{ave}$ in a stacking structure determined from a diffraction peak originating in a (002) crystal lattice plane, and X-ray diffraction spectrum components on the lower angle side with respect to the diffraction peak originating in a (002) crystal lattice plane of X-ray diffraction spectrum, and half width at half maximum HW of a peak appearing in the vicinity of 1340 cm$^{-1}$ in Raman spectrum are restricted. Accordingly, in the case where such carbon material is used as an anode material of a lithium non-aqueous electrolyte battery, the quantity of lithium doped is far greater than the theoretical value which can be obtained.

In addition, such anode material is obtained by allowing a carbon precursor which becomes non-graphitizable carbon by baking to undergo heat treatment at a temperature of 600° or more under the inactive gas atmosphere of flow rate of 0.1 ml/min. or more per gram of precursor, or under the atmospheric pressure less than 50 kPa, and any additional operation except for manufacturing operations until now such as addition of additive into material is unnecessary. Accordingly, this invention is advantageous for simplification of a manufacturing operation and reduction of cost. Therefore, the industrial value is extremely great.

BEST MODE FOR CARRYING OUT THE INVENTION

Figure 1:
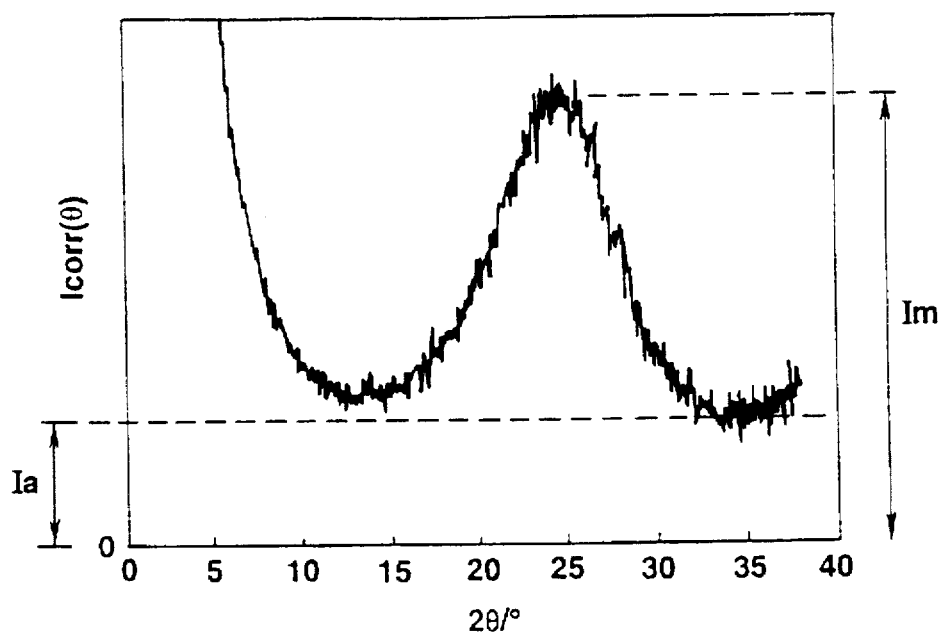
FIG. 1 is a characteristic diagram showing a curve Icorr (θ) obtained by correcting an X-ray diffraction spectrum of non-graphitizable carbon material.

In this invention, in order to obtain anode material having great lithium dope quantity, non-graphitizable carbon material in which a ratio by weight of carbon in a stacking structure Ps, stacking index SI and average number of carbon layers $n_{ave}$ in the stacking structure, which are parameters reflecting the ratio of the portion where carbon atoms take a stacked layer structure in non-graphitizable carbon material, satisfy the following condition is used as an anode material:

Ps<0.59

SI<0.76

$n_{ave}$<2.46

Namely, non-graphitizable carbon material means carbon material such that graphitization is not easily developed even using high temperature heat treatment such as 3000° C. In this embodiment, it is assumed that non-graphitizable carbon material indicates carbon material in which the $d_{002}$ value after heat treatment at 2600° C. is 3.40 angstroms or more.

Such non-graphitizable carbon material consists of a stacked layer structure portion in which carbon atoms form a stacked layer structure portion and a non-stacked layer structure portion. Here, it is considered that in the case where non-graphitizable carbon material is used as an anode material, lithium is not only doped into carbon layers of the stacked layer structure portion, but also is doped into micro (very small) vacancies of disturbed carbon layer of the non-stacked layer structure portion. With respect to a vacancy in which volume is too large, lithium is unable to remain therein, so such a vacancy does not contribute to doping with lithium. However, with respect to a very small vacancy in which volume is reasonably small, lithium can remain therein. Such very small vacancies can contribute to doping of lithium. In the case where a large number of very small vacancies exist, lithium dope quantity is far greater than the ideal lithium dope quantity 372 mAh/g determined on the assumption that lithium doping only between carbon layers can be obtained.

When it is assumed that the density of non-graphitizable carbon material is substantially fixed, as the ratio of the non-stacked layer structure portion becomes greater, i.e., ratio of the stacked layer structure portion becomes smaller, a larger number of such very small vacancies of the non-stacked layer structure portion exist.

Non-graphitizable carbon material in which parameters Ps, SI, $n_{ave}$ reflecting a ratio of the stacked layer structure portion which satisfies the above-described condition, and which is proposed as anode material in this invention, is non-graphitizable carbon material in which the ratio of the stacked layer structure is small, and includes many very small vacancies in the non-stacked layer structure portion. Accordingly, such a large number of very small vacancies effectively contribute to doping with lithium. Thus, a large lithium dope quantity can be obtained.

Here, parameters Ps, SI, n ave reflecting a ratio of the stacked layer structure portion are determined by carrying out data processing, in accordance with a predetermined procedure, using data obtained from a fraction peak originating in (002) crystal lattice plane and a spectrum component on the lower angle side with respect to the diffraction peak originating in (002) crystal lattice plane of X-ray diffraction spectrum of the non-graphitizable carbon material.

As the data processing method for determining the above-mentioned parameters, there is a method disclosed formerly in R. E. Franklin [Acta Cryst., 3, 107 (1950)], and also partially described in detail in H. P. Klug and L. E. Alexander, X-ray diffraction Procedures, p. 793 (John Wiley and Sons, Inc.). This method is applied in Shiraishi, Sanada, Bulletin of Chemical Society of Japan, 1976, No. 1, p. 153, Ogawa, Kobayashi, Carbon, 1985, No. 120, p-28, and M. Shiraishi, K. Kobayashi, Bulletin of Chemical Society of Japan, 46, 2575, (1973), etc., and is widely recognized.

In this invention, SI, Ps, $n_{ave}$ are determined by a simple method which is in conformity with the method disclosed in the above-mentioned literature, but is partially simplified for easier execution.

The data processing procedure of the simple method will be described below.

(1) Initially, an X-ray diffraction spectrum of a non-graphitizable carbon material sample in which SI, Ps and $n_{ave}$ are to be determined is observed. With respect to the X-ray diffraction spectrum, correction is made by dividing diffraction intensity $I(\theta)$ by squares of polarization factor, absorption factor as determined by the following formulas (1) and (2) and atomic scattering factor. It is to be noted that while the atomic scattering factor is defined as a function of $\sin \theta B/\lambda$, there is used, for obtaining this factor, an approximate value with respect to a carbon atom which is not in a valence state described in International Tables for X-ray Crystallography, vol. IV, p 71 (The kynoch Press, 1974).

In addition, diffraction intensity $I(\theta)$ may be either X-ray count value per second or X-ray count value, and is an arbitrary intensity.

$$\text{Polarization factor} = \frac{1 + \cos^2 2\theta \cdot \cos^2 2\alpha}{1 + \cos^2 2\alpha} \quad (1)$$

-continued $$\text{Absorption factor} = \left( \sec\theta - \frac{t}{A} \cdot \tan\theta \right) \cdot \exp[-\mu \cdot t \cdot (\sec\theta - 1)] \quad (2)$$

$$; 0 < t < \left( \frac{A}{2} \right) \cdot \csc\theta$$

$$= \left( \frac{A}{2 \cdot t} \right) \cdot \csc 2\theta \cdot \exp[-\mu \cdot t \cdot (\sec\theta - 1)]$$

$$; t \geq \left( \frac{A}{2} \right) \cdot \csc\theta$$

In the above-mentioned formulas,

A: width when X-rays impinge on the sample surface, which is indicated by $A = 1 \cdot \sin\beta$ when the distance from X-ray source to the sample is 1 and width of the divergence slit is $\beta$, t: thickness of sample $\mu$: linear absorption coefficient of sample given by product of mass absorption coefficient (4.17) and specific gravity of sample $\alpha$: half of diffraction angle of monochrometer (2) Curve Icorr ($\theta$) obtained by correcting X-ray diffraction spectrum is shown in FIG. 1. As seen from FIG. 1, there is a minimum value in the vicinity of $2\theta$=about 36 degrees in this curve Icorr ($\theta$). This minimum value is assumed to be Ia, and the peak intensity of the peak originating in (002) crystal lattice place is assumed to be Im. In this case, it is preferable to implement smoothing processing in advance with respect to about 15 to 35 points in the range of $2\theta=15-{}^\circ38^\circ$ for the purpose of avoiding the influence of noise in signal. Then, by substituting Im and Ia, determined in this way, in the following formula (3), SI value is determined.

$$SI = \frac{Im - Ia}{Im} \quad (3)$$

Figure 2:
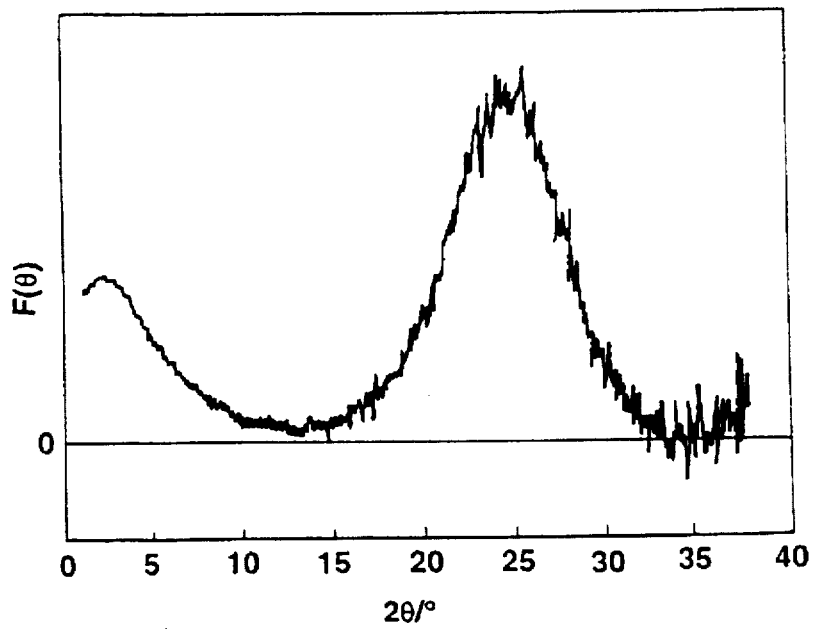
FIG. 2 is a characteristic diagram showing a curve F(θ) obtained by subtracting a minimum value Ia from the curve Icorr(θ) to multiply it by sin(θ).

(3) On the other hand, the minimum value Ia is subtracted from curve Icorr ($\theta$) to which no smoothing processing is implemented to multiply the subtracted value by sino to determine intensity $F(\theta)$. Curve $F(\theta)$ thus obtained is shown in FIG. 2.

(4) The curve $F(\theta)$ thus obtained is substituted in the following formula (4) to determine the Patterson function.

$$\Sigma \left[ f(\theta) \cdot \cos \left( \frac{4 \cdot \pi \cdot u \cdot \sin\theta}{\lambda} \right) \cdot \cos\theta \cdot \Delta\theta \right] \quad (4)$$

Figure 3:
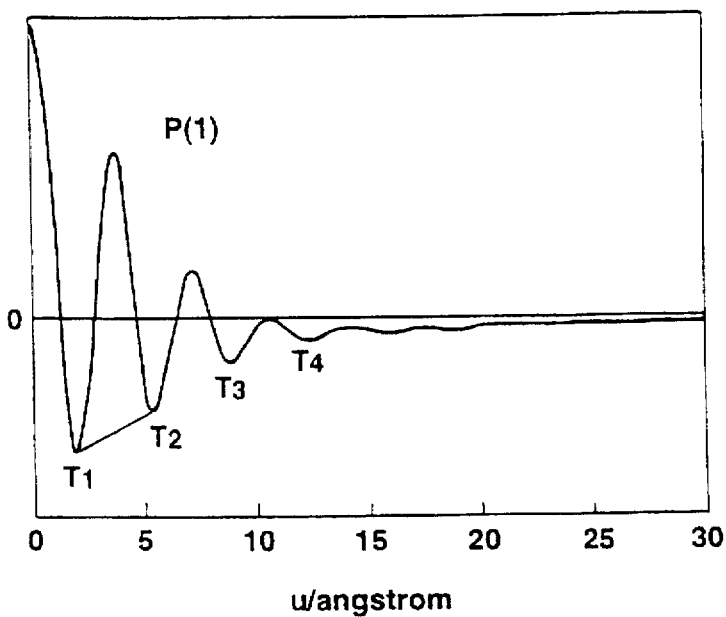
FIG. 3 is a characteristic diagram showing a Patterson function curve obtained by implementing Fourier transform processing to the curve F(θ).

This formula (4) is obtained by replacing the ordinary Fourier transform formula $$\int F \cos (2 \cdot \pi \cdot u \cdot s) \cdot ds \quad (s = 2 \cdot \sin \theta/\lambda)$$

by the formula of sum total at $\theta$. The determined Patterson function curve is shown in FIG. 3. As shown, the transform range to the real space of the Patterson function is caused to be broad until the reference (value) is sufficiently attenuated. Points u giving minimum values of the Patterson function curve are assumed to be $T_1, T_2 \ldots T_\eta$ in reverse order of magnitude to respectively determine areas p(n) encompassed by a straight line and the Patterson function between $T_n$ and $T_{\eta+1}$.

(5) The ratio by weight of carbon in stacks of n layers in stacking structure, in the non-graphitizable carbon material is determined by the following formula (5) by using p(n).

$$f(n) = \frac{p(n-1) - 2 \cdot p(n) + p(n+1)}{p(1) - p(2)} \quad (5)$$

$n \geq 2$

In this case, calculation of f(n) indicated by the formula (5) is carried out up to n which is smaller by one than n when f(n) value becomes 0 or negative for the first time.

Then, $n_{ave}$ is determined by the following formula (6) by using the determined f(n).

$$n_{ave} = \frac{\Sigma f(n)}{\Sigma \frac{f(n)}{n}} \quad (6)$$

Figure 4:
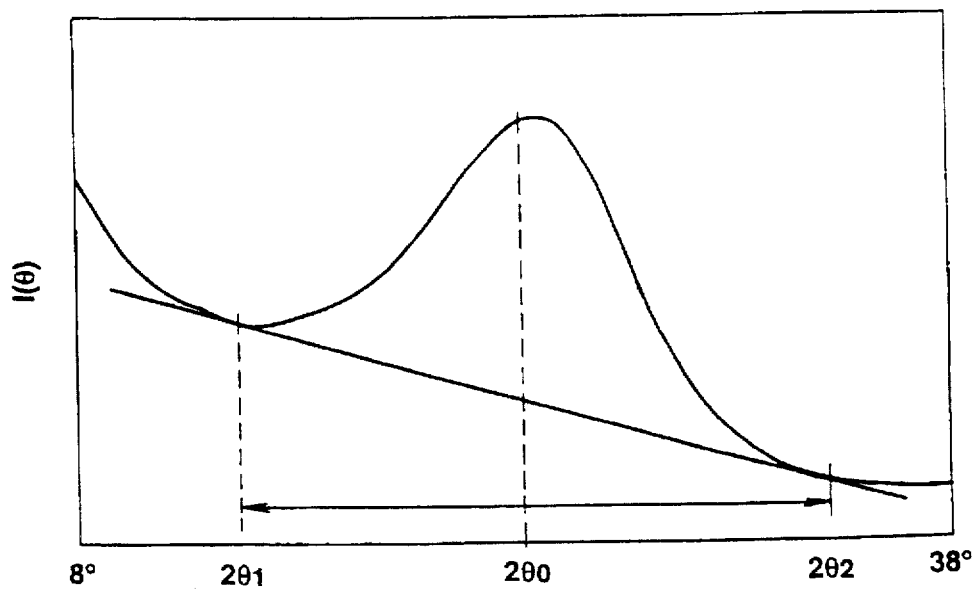
FIG. 4 is a characteristic diagram showing curve I(θ) obtained by allowing an X-ray diffraction spectrum to undergo smoothing processing.

(6) Then, spacing $d_{002}$ of the (002) crystal lattice plane is determined in the following manner. Namely, with respect to the diffraction peak originating in the (002) crystal lattice plane of the X-ray diffraction spectrum observed in (1), a smoothing processing of about 15 to 35 points is implemented. Curve I(θ) obtained by allowing the X-ray diffraction spectrum to undergo the smoothing processing is shown in FIG. 4. Then, as shown in FIG. 4, a base line is drawn with respect to the diffraction peak of the curve I(θ) to integrate the portion encompassed by the base line and the diffraction peak between both contact points of the diffraction peak and the base line. By substituting 2θ just halving the integral intensity for the formula of Bragg, $d_{002}$ is determined.

(7) By using values of $n_{ave}$, SI and $d_{002}$ determined in a manner as described above, the ratio by weight of carbon in stacking structure Ps is determined by the following formula (7).

$$Ps = \frac{SI}{SI \cdot (1 - Isp) + Isp} \quad (7)$$

In the above formula, $Isp = 0.0606 \cdot n_{ave} \cdot d_{002}^2$

The data processing procedure for determining SI, $n_{ave}$, Ps has been described. While SI of these parameters is determined by the method called a transmission method, it is not necessarily required to determine this parameter by this method, but a reflection method ordinarily used may be employed to make correction by a suitable absorption factor, etc. to determine such parameter. In addition, it is possible to derive a parameter which correlates with SI from values corresponding to Im, Ia of the uncorrected i(θ) curve although many errors are included.

Non-graphitizable carbon material in which SI, $n_{ave}$ and Ps determined in this way satisfy the predetermined condition exhibits high lithium dope quantity. Further, in this invention, there is also used, as anode material, non-graphitizable carbon material in which the half width at half maximum HW of the peak appearing in the vicinity of 1340 $cm^{-1}$ in the Raman spectrum satisfies the following condition:

$HW > 138 - 0.06 \cdot T$

Namely, when the Raman spectrum is observed with respect to non-graphitizable carbon material, peaks can be observed in the vicinity of 1340 $cm^{-1}$ and in the vicinity of 1580 $cm^{-1}$. The peak in the vicinity of 1580 $cm^{-1}$ originates in graphite structure in which carbon atoms are strongly coupled to each other, i.e., the above-described stacked layer structure portion. On the other hand, the peak in the vicinity of 1340 $cm^{-1}$ originates in phase where the symmetrical property is inferior to that of a graphite structure in which carbon atoms are weakly coupled to each other, i.e., the above-described non-stacked layer structure portion. The half width at half maximum HW of the peak in the vicinity of 1340 $cm^{-1}$ reflects the degree of unevenness of coupling state between carbon atoms at the non-stacked layer structure portion.

It is estimated that in the case where the half width at half maximum HW is greater than 138−0.06·T, unevenness of the coupling state between carbon atoms in the non-stacked layer structure portion is reasonably great and there are a large number of very small pores contributing to lithium doping. In such a case, high lithium dope quantity can be obtained.

It is to be noted that the half width at half maximum of the peak in the vicinity of 1340 $cm^{-1}$ mentioned here is a value which is one half of a value ordinarily called half-power band width. Namely, a base line is drawn with respect to the peak waveform of the Raman spectrum which has been subjected to a fitting to draw a straight line in parallel to the base line at the point where the intensity from the peak top up to the base line is ½. Intersecting points of the peak waveform and the straight line are assumed to be points A, B to read abscissa corresponding to these points A, B. The difference between read values of the abscissa corresponding to points A, B is a half-power band width, and a value which is one half of the half-power band width is the half width at half maximum.

Such non-graphitizable carbon material can be obtained by baking a carbon precursor exemplified below.

Namely, as precursor of the non-graphitizable carbon, there are enumerated material in which a functional group including oxygen is introduced into petroleum pitch, and carbon material in which solid phase carbonization is developed via thermosetting resin, etc.

For example, the above-mentioned petroleum pitch is obtained from the tar family created by high temperature thermal decomposition such as coal tar, ethylene bottom oil or crude oil, etc. or by operation such as distillation (vacuum distillation, ordinary pressure distillation, steam distillation) thermal polymerization/condensation, extraction, or chemical polymerization/condensation, etc. At this time, the H/C atom ratio of petroleum pitch is required to have 0.6–0.8 in order to allow it to be non-graphitizable carbon.

Practical means for introducing a functional group including oxygen into such petroleum pitch is not limited, but, e.g., a wet method by aqueous solution of nitric acid, mixed acid, sulfuric acid or hypochlorous acid, a dry method by oxidizing gas (air, oxygen), and a reaction by solid reagent such as sulfur, ammonium nitrate, ammonium persulfate, or ferric chloride, etc. are used.

Although oxygen percentage content is not particularly prescribed, it is preferably 3% or more, and is more preferably 5% or more as disclosed in the Japanese Patent Application Laid Open No. 252053/1991. This oxygen percentage content affects crystal structure of the carbonaceous material finally produced. When the oxygen percentage content is caused to be in the above-mentioned range, there results a material having spacing $d_{002}$ of (002) plane of 3.70 angstroms or more, no exothermic peak at a temperature of 700° C. or more in Differential Thermal Analysis (DTA) in air flow, and large anode capacity.

On the other hand, as organic material serving as the precursor, phenol resin, acryl resin, vinyl halide resin, polyimide resin, polyamideimide resin, polyamide resin, polyacetylene, conjugate resin such as poly (p-phenylene), etc., cellulose and its derivative, and arbitrary organic high molecular compound can be used. In addition, condensed polycyclic hydro carbon compound such as naphthalene, phenanthrene, anthracene, triphenylene, pyrene, perylene, pentaphene, or pentacene, etc., other derivatives (e.g., carbonate, carboxylic anhydride, carboxylic imide thereof, etc.), various pitches including mixtures of the above-mentioned respective compounds as a major component, condensed heterocyclic compound such as acenaphthalene, indol, isoindol, quinoline, isoquinoline, quinoxaline, phthalazine, carbazole, acridine, phenazine, phenanthridine, etc., and other derivatives may be used. In addition, particularly furan resin consisting of homo polymer or copolymer of furfuryl alcohol or furrural is also suitable.

Material which undergoes liquid phase carbonization along with heat treatment of the above-mentioned organic materials gives easily graphitizable carbon. It is sufficient to implement non-fusion processing to such organic materials so as to undergo solid phase carbonization. Namely, it is sufficient to make a device such that the crosslinking reaction between molecules starts at a temperature lower than the temperature at which fusion starts, e.g., there is employed a method of introducing an oxygen-including group by a method similar to the method of implementing processing for the petroleum pitch, a method of adding chlorine gas or sulphur, or a method of allowing a catalyst for promoting the crosslinking reaction to exist, etc.

While carbonaceous material can be obtained by baking the carbon precursors exemplified above, the baking atmosphere in baking the carbon precursor is important in order to obtain carbonaceous material having a high lithium dope quantity.

Namely, in this invention, the baking of the carbon precursor is carried out under the inactive gas atmosphere of flow rate of 0.1 ml/second per carbon precursor of 1 g, or under the atmosphere of pressure less than 50 kPa. When the baking of the carbon precursor is carried out under the inactive gas atmosphere of a flow rate of 0.1 ml/second or more per carbon precursor of 1 g, the volatile component is eliminated by the flow of inactive gas. On the other hand, when the baking of the carbon precursor is carried out under the low pressure atmosphere of pressure less than 50 kPa, diffusion/desorption of the volatile component from the carbon precursor is promoted, and the volatile component is thus efficiently eliminated. When the baking of the carbon precursor is carried out under an atmosphere such that the volatile component produced by carbonization is eliminated from the outside of the reaction system, carbonization is smoothly developed. Thus, carbonaceous material having a high lithium dope quantity can be obtained.

First, in the case where the carbon precursor is baked under the inactive gas atmosphere of a flow rate of 0.1 ml/second or more per carbon precursor of 1 g, the inactive gas is gas which does not react with carbonaceous material at carbonization temperatures of 900° C.–1500° C. For example, this inactive gas is a gas including, as major component, nitrogen, argon, or a mix gas thereof.

Moreover, at this time, to what degree the volatile component is eliminated is dependent upon not only the flow rate of the atmosphere, but also the quantity of carbon precursor forwarded to carbonization. Accordingly, in this embodiment, the flow rate of the atmosphere is prescribed by flow rate per carbon precursor unit weight. When flow rate per 1 g of carbon precursor is 0.1 ml/second or more, improvement in anode capacity results.

It is to be noted that the quantity of carbon precursor indicates the total quantity within a furnace in the case of the batch type carbonization furnace, and indicates the quantity of carbon precursor heated preferably up to 800° C. or more and more preferably up to 700° C. or more in the case of a continuous type carbonization furnace in which the carbon precursor is thrown with the passage of time and the carbonaceous material is taken out therefrom.

Further, the inactive atmosphere flow rate is caused to be a quantity sufficient to be in contact with the carbon precursor heated preferably up to a temperature of 800° C. or more and more preferably to a temperature of 700° C. or more and to be exhausted to the outside of the carbonization furnace. Accordingly, the flow of the inactive atmosphere with a view to replacement of the atmosphere within the system before the temperature of carbonization furnace or the carbon precursor is elevated preferably up to 800° C. and more preferably up to 700° C. is not included in this invention.

It is to be noted that when the area in contact with the atmosphere per 1 g of carbon precursor is assumed to be 10 $cm^2$ or more in rough surface form, the carbon precursor is apt to be in contact with the inactive gas, so the volatile component is more efficiently removed and development of carbonization is more smoothly conducted. In this case, the contact area in rough form mentioned here does not include random very small unevenness of the material surface, or very small specific surface area within a particle.

For example, by dividing carbon the precursor to stack layers in multi-stage form, or agitating it (in this case, the specific surface area of carbon precursor becomes an area in contact with the atmosphere), the contact area of carbon precursor can be broadened.

On the other hand, in the case where the carbon precursor is baked under the low pressure atmosphere of a pressure less than 50 kPa, it is sufficient that the pressure under the atmosphere is kept so that it is less than 50 kPa at the time when temperature is elevated so that carbonization is attained or at a certain time during temperature elevation. It is sufficient that evacuation within the carbonization furnace may be carried out before the carbonization furnace or carbon precursor is heated, or in the process of temperature elevation thereof or for a time period during which temperature at which carbonization is attained is held.

It is to be noted that in the case where carbonization (baking of the carbon precursor) is carried out under any atmosphere, the heating system of the carbonization furnace is not particularly limited, and induction heating or resistance heating, etc. may be employed for this purpose.

Moreover, arrival temperature and/or temperature elevation speed in carbonization are not particularly limited. For example, after provisional baking is carried out at 300°~700° C. in an inactive atmosphere, regular baking may be carried out under the condition of a temperature elevation of 1° C./second or more, arrival at a temperature of 900°–1500° C., and holding time at the arrival temperature of about 0 to 5 hours under the inactive atmosphere. Of course, the provisional baking operation may be omitted depending upon the circumstances.

Further, carbonaceous material obtained in this way is crushed and sieved before being used (applied) as anode material- Such crushing may be carried out at any time before carbonization, after carbonization, or after baking.

An anode consisting of the anode material made in a manner as described above is accommodated into a battery can along with cathode and electrolytic solution, and functions as the anode of the battery.

Here, since the non-aqueous electrolyte secondary battery of this invention aims at attaining a high capacity, it is necessary for the cathode to include Li corresponding to a charge/discharge capacity of 250 mAh or more per 1 g on the anode of carbonaceous material in a steady state (after about five times of charge/discharge operations are repeated). It is preferable to include Li corresponding to a charge/discharge capacity of 300 mAh or more, and it is more preferable to include Li corresponding to a charge/discharge capacity of 350 mAh or more.

It is to be noted that it is not necessarily required that Li is entirely delivered from the cathode material. It is sufficient that Li corresponding to a charge/discharge capacity of 250 mAh or more per 1 g on the anode of carbonaceous material exists within the battery system. Moreover, it is assumed that this quantity of Li is judged by measuring the discharge capacity of the battery.

For cathode material constituting the cathode, e.g., compound metal oxide indicated by the general expression LIMO2 (M indicates at least one of Co and Ni), or an interlayer compound including Li is suitable. Satisfactory results are obtained particularly when $LiCoO_2$ is used.

Moreover, while a non-aqueous electrolytic solution is prepared by suitably combining organic solvent and electrolyte, any materials which are used in batteries of this kind may be used as such organic solvent and/or electrolyte.

For example, as the organic solvent propylene carbonate, ethylene carbonate, diethyl carbonate, dimethyl carbonate, 1,2-dimethoxy ethane, 1,2-diethoxy ethane, λ-butyrolactone, tetrahydrofuran, 2-methyl tetrahydrofuran, 1,3-dioxysolan, 4-methy-1,3-dioxysolan, diethyl ether, sulforan, methyl sulforan, acetonitrile, propionitrile, anisole, acetic ester, butyric ester, propionic ester, etc., may be used.

As the electrolyte, $LiClO_4$, $LiAsF_6$, $LiPF_6$, $LiBF_4$, LiB $(C_6H_5)_4$, $CH_3SO_3Li$, $CF_3SO_3Li$, LiCl, LiBr, etc., may be used.

This invention will be described below on the basis of practical experimental results.

Embodiment 1

First, the carbonaceous material was manufactured as follows.

Petroleum pitch (H/C atomic ratio: 0.6–0.8) was oxidized to prepare a carbon precursor with an oxygen percentage content of 15.4%. Then, this carbon precursor was carbonized at 500° C. for 5 hours in a nitrogen gas flow. Then, beads obtained by carbonization were crushed by mill so that a carbonized material is provided. About 10 g of the carbonized material was contained in a crucible. The carbonized material of 10 g in the crucible was baked under a nitrogen gas flow of 10 l/min., temperature elevation speed of 5° C./min., arrival temperature of 1100° C., and holding time of 1 hour within an electric furnace. Thus, carbonaceous material was obtained. Layer thickness of carbonized material within the crucible at this time was about 30 mm, and the area in contact with the nitrogen gas flow was −7 $cm^2$.

After the carbonaceous material thus obtained was cooled, it was crushed within mortar, and was sieved into particles less than 38 pm by mesh.

With respect to the carbonaceous material, the Raman scattering spectrum and the X-ray diffraction spectrum were measured. Then, the half width at half maximum of the peak appearing in the vicinity of 1340 $cm^{-1}$ in the Raman scattering spectrum was determined. Further, data obtained from the X-ray diffraction spectrum was subjected to data processing in accordance with a predetermined procedure to thereby determine a ratio by weight of carbon in a stacking structure Ps, stacking index SI and the average number of carbon layers $n_{ave}$ in the stacking structure.

The half width at half maximum of the peak appearing in the vicinity of 1340 $cm^{-1}$ in the Raman scattering spectrum was determined as follows.

Initially, $Ar^+$ laser beams of wavelength of 514.5 nm and an irradiation power of 200 mW was irradiated on a carbonaceous material powder sample using an incident beam diameter of 1 mm to converge scattered light pseudo-backward scattering to optically separate the converged light by using a spectrometer to thereby measure the Raman spectrum. In the case of this method, since the beam diameter of the $Ar^+$ laser beams for obtaining scattered light is the large value of 1 mm, the Raman scattering spectrum measured becomes a scattering mean (average value) of a large number of carbon material particles existing within the beam diameter. Accordingly, the Raman spectrum is measured with high reproducibility and accuracy.

In this example, a double monochrometer manufactured by JOBIN-YVON COMPANY and Trade Name U-1000 was used as the spectroscope (spectrometer). The slit width is 400-800-800-400 μM.

The Raman scattering spectrum measurements were taken 4 times in total except that the irradiation position was shifted to carry out fitting processing with respect to respective Raman spectrum components. Then, the half width at half maximum values of the peak in the vicinity of 1340 $cm^{-1}$ were determined with respect to the respective spectrum components to calculate an average value of four half width at half maximum data to allow the average value thus calculated to be the half width at half maximum.

Moreover, the X-ray diffraction spectrum was measured by the following condition.

X-ray diffraction measurement condition

X ray: CuKα ray (wavelength λ=1.5418 angstroms)

Measurement device: Trade Name RAD-IIIB by Rigaku sha

Application voltage and Application current: 40 kV, 30 mA

Solar slit width: 0.5 degrees

Divergence slit width: 0.5 degrees

Reference slit width: 0.15 degrees

Sampling interval: 0.05 degrees

Scanning speed: 1 degrees/min.

Scanning width: 1–38 degrees at 2θ

Graphite monochrometer is used (diffraction angle 2a of monochrometer: about 26.6 degrees)

Sample filling system:
Sample is filled into opening portion of 5 mm×18 mm bored at a plate made of SUS of thickness of 0.5 mm so that the thickness is equal to 0.5 mm.

HW, Ps, SI, $n_{ave}$ determined by the above-mentioned method and condition are shown in Table 1.

Moreover, the above-mentioned carbonaceous material was used as an anode material to make up an anode of a coin type battery to measure the anode capacity of the carbonaceous material.

Initially, in order to make up an anode, a pre-heat treatment was implemented to the carbonaceous material under the condition of temperature elevation speed of about 30° C./min, arrival temperature of 600° C. and arrival temperature holding time of one hour under an argon atmosphere (It is to be noted this heat treatment was carried out immediately before adjustment of the anode mix indicated below). Then, polyvinylidene fluoride corresponding to 10% by weight was added to the carbonaceous material to mix dimethyl formamide as solvent to dry it to prepare an anode mix.

37 mg of the anode mix prepared in this way was mixed with nickel mesh serving as a collector (electricity collecting body) to mold it into pellet of diameter of 15.5 mm thus to prepare the anode.

Then, the anode thus made up was assembled into a coin type battery of the configuration indicated below to carry out charge/discharge at 1 mA (current density 0.53 mA/cm$^2$) to measure discharge capacity per 1 g of anode carbonaceous material. The configuration and the charge/discharge condition of the coin type battery were as indicated below.

Configuration of the coin type battery

Coin type battery dimensions: diameter 200 mm, thickness 2.5 mm

Cathode: Li metal

Separator: porous film (polypropylene)

Electrolytic solution: solution in which LiClO4 is dissolved into mixed solvent of propylene carbonate and dimethoxyethane (1:1 in terms of volume ratio) with a ratio of 1 mol/l.

Collector: Copper foil

Charge/Discharge condition

Charge: current-imposition of one hour and relaxation of two hours were repeated to extrapolate a plot of power of (−½) of relaxation time versus relaxation voltage at times of respective relaxation of operations with respect to indefinite time to estimate an equilibrium potential at each charge capacity (intermittent charge/discharge method). Charge was assumed to be completed when this equilibrium potential reaches 2 mV against the lithium electrode.

Discharge: current-imposition of one hour and relaxation of two hours are repeated similarly to the charge operation to complete discharge at the time point when the battery voltage is below 1.5 volts in closed circuit state.

Since the charge/discharge capacity estimated by this method uses equilibrium potential as a reference, the charge/discharge capacity reflects the characteristic inherent in the material.

Anode capacity of carbonaceous material measured in this way is shown in Table 1 along with the above-described HW, SI, Ps and $n_{ave}$.

TABLE 1

|  | Ps | SI | $n_{ave}$ | HW (cm$^{-1}$) | 138 − 0.06 · T | ANODE CAPACITY (mAg/g) |
| --- | --- | --- | --- | --- | --- | --- |
| EMBODIMENT 1 | 0.531 | 0.700 | 2.437 | 76 | 72 | 378 |

COMPARATIVE EXAMPLE 1

Carbonaceous material was manufactured similarly to the example in embodiment 1 except that the baking of the carbonized material was not carried out under the nitrogen gas flow. In this example, the arrival temperature in baking was changed to 1100° C., 1200° C. and 1300° C.

The Raman spectrum and the X-ray diffraction spectrum were measured with respect to the carbonaceous material thus obtained to determine the half width at half maximum of the peak appearing in the vicinity of 1340 cm$^{-1}$ in the Raman scattering spectrum to implement a predetermined data processing of data obtained from the X-ray diffraction spectrum to thereby determine a ratio by weight of carbon in a stacking structure Ps, stacking index SI and average number of carbon layers $n_{ave}$ in a stacking structure. Moreover, the carbonaceous material was used as anode material to make up a coin type battery to carry out charge/discharge under the current-imposed condition of 1 mA with respect to the manufactured coin type battery to measure discharge capacity per 1 g of anode carbonaceous material. Measured results of HW, Ps, SI, n ave and anode capacity were shown in Table 2.

TABLE 2A

|  | BAKING TEMPERATURE | Ps | SI | $n_{ave}$ |
| --- | --- | --- | --- | --- |
| COMPARATIVE EXAMPLE | 1100 | 0.597 | 0.755 | 2.471 |
|  | 1200 | 0.607 | 0.700 | 2.463 |
|  | 1200 | 0.610 | 0.774 | 2.484 |

TABLE 2B

|  | HW (cm$^{-1}$) | 138 − 0.06 · T | ANODE CAPACITY (mAh/g) |
| --- | --- | --- | --- |
| COMPARATIVE EXAMPLE 1 | 64 | 72 | 296 |
|  | 55 | 66 | 248 |
|  | 51 | 60 | 216 |

As seen from comparison between Tables 1 and 2, the carbonaceous material made up in the embodiment 1 is such that HW, Ps, SI and $n_{ave}$ satisfy the predetermined conditions $(HW>138-0.06 \cdot T,\ Ps<0.59,\ SI<0.76,\ n_{ave}<2.46)$, and has a large anode capacity of 378 mAh. On the contrary, the carbonaceous materials made up in the comparative example 1 is such that HW, Ps, SI, $n_{ave}$ do not satisfy the predetermined condition, and has a smaller anode capacity as compared to the carbonaceous material of the embodiment 1.

Accordingly, it has been found out from facts as described above that the method of carrying out baking of carbon precursor under the inactive air flow atmosphere is such that HW, Ps, SI, n ave satisfy the predetermined condition, and is effective for obtaining carbonaceous material having a large anode capacity.

Embodiment 2

Carbonaceous material was manufactured similarly to the example in embodiment 1 except that the quantity of carbonized material laid into the crucible is set to 1 g in baking carbonized material.

Then, the Raman spectrum and the X-ray diffraction spectrum were measured with respect to the carbonaceous material thus obtained to determine the half width at half maximum of the peak appearing in the vicinity of 1340 cm$^{-1}$ in the Raman scattering spectrum to further implement a predetermined data processing of data obtained from the X-ray diffraction spectrum to thereby determine a ratio by weight of carbon in a stacking structure Ps, stacking index sI and the average number of carbon layers $n_{ave}$ in a stacking structure. Moreover, the carbonaceous material thus obtained was used as an anode material to make up a coin type battery to carry out charge/discharge under the current-imposed condition of 1 Ma with respect to the coil type battery thus made up to measure discharge capacity with respect to 1 g of the anode carbonaceous material. Measured results of HW, Ps, SI, $n_{ave}$ and anode capacity are shown in Table 3.

TABLE 3

|  | Ps | SI | $n_{ave}$ | HW (cm$^{-1}$) | 138 − 0.06 · T | ANODE CAPACITY (nAh/g) |
|---|---|---|---|---|---|---|
| EMBODIMENT 2 | 0.525 | 0.706 | 2.426 | 86 | 72 | 442 |

As seen from the Table 3, with respect to the carbonaceous material manufactured by the above-mentioned method, HW, Ps, SI and $n_{ave}$ satisfy the predetermined condition, and the anode capacity takes a value of 442 mAh/g greater than that in the case of the carbonaceous material of the embodiment 1.

From the facts as described above, it has been found that, in carbonaceous material obtained by baking carbon precursor under the inactive gas flow atmosphere, anode capacity is dependent upon not only flow rate of inactive air flow in baking carbon precursor, but also on the quantity of carbon precursor to be baked, and accordingly as inactive air flow quantity per 1 g of carbon precursor becomes greater, anode capacity increases.

Embodiment 3

Carbonaceous material was manufactured similarly to the example of embodiment 1 except that, in baking carbonized material, an alumina boat was used in place of the crucible and the carbonized material is mounted on the alumina boat. In this embodiment, the layer thickness of the carbonized material on the alumina boat was about 10 mm, and the area in contact with nitrogen gas flow was ~300 cm$^2$.

Then, the Raman spectrum and the X-ray diffraction spectrum were measured with respect to the carbonaceous material thus obtained to determine the half width at half maximum of the peak appearing in the vicinity of 1340 cm$^{-1}$ in the Raman scattering spectrum to further implement the predetermined data processing of data obtained from the X-ray diffraction spectrum to thereby determine the ratio by weight of carbon Ps, stacking index SI and the average number of carbon layers $n_{ave}$ in a stacking structure. Moreover, the carbonaceous material thus obtained was used as an anode material to make up a coin type battery to carry out charge/discharge under the current-imposed condition of 1 mA with respect to the coin type battery made up to measure discharge capacity per 1 g of anode carbonaceous material. Measured results of HW, Ps, SI, $n_{ave}$ and anode capacity are shown in Table 4.

TABLE 4

|  | Ps | SI | $n_{ave}$ | HW (cm$^{-1}$) | 138 − 0.06 · T | ANODE CAPACITY (mAh/g) |
|---|---|---|---|---|---|---|
| EMBODIMENT 3 | 0.499 | 0.675 | 2.443 | 79 | 72 | 432 |

As seen from Table 4, with respect to the carbonaceous material made up by the above-mentioned method, HW, Ps, SI and $n_{ave}$ satisfy the predetermined condition, and the anode capacity takes a value of 432 mAh/g, which is greater than that in the case of the carbonaceous material of the example of embodiment 1.

From facts as above, it has been found out that in the carbonaceous material obtained by baking the carbon precursor under the inactive gas flow atmosphere, anode capacity is dependent upon layer thickness, i.e., the contact area of the carbon precursor during baking, and accordingly as the layer thickness of the carbon precursor becomes thin, and the contact area thereof becomes greater, the anode capacity increases. This is because the volatile component is more satisfactorily eliminated in the case where the layer thickness of carbon precursor becomes thinner.

Embodiment 4

Carbonaceous material was manufactured similarly to the example of embodiment 1 except that, in baking the carbonized material, about 10 g of the carbonized material was laid into the crucible to bake it, while keeping pressure within an electric furnace at about 20 kPa, under the condition of temperature elevation of 5° C./min., arrival temperature of 1100° C., 1200° C. or 1300° C., and holding time at the arrival temperature of one hour.

Then, the Raman spectrum and the X-ray diffraction spectrum were measured with respect to the carbonaceous material thus obtained to determine the half width at half maximum of the peak appearing in the vicinity of 1340 cm$^{-1}$ in the Raman Scattering spectrum to further implement the predetermined data processing of data obtained from the X-ray diffraction spectrum to thereby determine a ratio by weight of carbon Ps, stacking index SI, and average number of carbon layers naw in a stacking structure. Moreover, the carbonaceous material was used as an anode material to make up a coin type battery to carry out charge/discharge under the current-imposed condition of 1 mA with respect to the coin type battery thus made up to measure discharge capacity per 1 g of anode carbonaceous material. Measured results of HW, Ps, SI, $n_{ave}$ and anode capacity are shown in Table 5.

TABLE 5A

|  | BAKING TEMPERATURE (°C.) | Ps | SI | $n_{ave}$ |
|---|---|---|---|---|
| EMBODIMENT 4 | 1100 | 0.504 | 0.670 | 2.408 |
|  | 1200 | 0.527 | 0.700 | 2.410 |
|  | 1300 | 0.568 | 0.731 | 2.415 |

TABLE 5B

|  | HW (cm$^{-1}$) | 138 − 0.06 · T | ANODE CAPACITY (mAh/g) |
|---|---|---|---|
| EMBODIMENT 4 | 88 | 72 | 463 |
|  | 79 | 66 | 437 |
|  | 70 | 60 | 383 |

COMPARATIVE EXAMPLE 2

Carbonaceous material was manufactured similarly to the example of embodiment 4 except that the pressure within the electric furnace was set to 60 kPa in baking the carbonized material.

Then, the Raman spectrum and the X-ray diffraction spectrum were measured with respect to the carbonaceous material thus obtained to determine the half width at half maximum of the peak appearing in the vicinity of 1340 cm$^{-1}$ in the Raman scattering spectrum to further implement a predetermined data processing of data obtained from the X-ray diffraction spectrum to thereby determine a ratio by weight of carbon Ps, stacking index SI, and average number of carbon layers $n_{ave}$ in a stacking structure. Moreover, the carbonaceous material was used as an anode material to make up a coin type battery to carry out charge/discharge under the current-imposed condition 1 mA with respect to the coin type battery thus made up to measure discharge capacity per 1 g of anode carbonaceous material.

As a result, HW, Ps, SI, $n_{ave}$ and anode capacity of the carbonaceous material of the comparative example 2 are on the same order as in the case of the comparative example 1, i.e., the above-mentioned parameters do not satisfy the predetermined condition, and the anode capacity is also small. On the contrary, in the case of the carbonaceous material of the example of embodiment 4, as seen from the Table 5, HW, Ps, SI, $n_{ave}$ satisfy the predetermined condition, and the material has an anode capacity far greater than that of the carbonaceous material of the comparative example 2.

Accordingly, it has been found out from the facts as described above that a method of baking carbon precursor under the low pressure atmosphere results in the fact that HW, Ps, SI, $n_{ave}$ satisfy the predetermined condition, and is effective for obtaining carbonaceous material having a large anode capacity.

Embodiment 5

Carbonaceous material was manufactured similarly to the example of embodiment 1 except that the baking of the carbonized material was carried out in a manner described below.

About 10 g of carbonized material was placed in the crucible to bake it at 900° C. within an enclosed electric furnace. After the temperature is lowered, about log was laid into the crucible for a second time to bake it, while keeping pressure within the electric furnace at about 20 kPa, under the condition of temperature elevation of 5° C./min., arrival temperature 1100° C., and holding time at the arrival temperature of one hour. Thus, carbonaceous material was obtained.

Then, the Raman spectrum and the X-ray diffraction spectrum were measured with respect to the carbonaceous material thus obtained to determine the half width at half maximum of the peak appearing in the vicinity of 1340 cm$^{-1}$ in the Raman spectrum to further implement a predetermined data processing of data obtained from the X-ray diffraction spectrum to thereby determine a ratio by weight of carbon Ps, stacking index SI, and average number of carbon layers $n_{ave}$ in a stacking structure. Moreover, the carbonaceous material thus obtained was used as an anode material to make up a coin type battery to carry cut charge/discharge under the current-imposed condition of 1 MA with respect to the coin type battery thus made up to measure discharge capacity per 1 g of anode carbonaceous material.

As a result, HW, Ps, SI, $n_{ave}$ and the anode capacity of carbonaceous material were on the same order as that of the carbonaceous material of the example of embodiment 4. From facts as described above, it has been found out that, in baking the carbon precursor under the low pressure atmosphere to obtain the carbonaceous material, even if an evacuating operation is carried out before the carbonization furnace or carbon precursor are heated, or in the process of temperature elevation or for a time period during which arrival temperature is held, HW, Ps, SI, $n_{ave}$ similarly satisfy the predetermined condition, and carbonaceous material having high a anode capacity is obtained.

COMPARATIVE EXAMPLE 3

Initially, carbonized material was manufactured similarly to the example of embodiment 1.

About 10 g of carbonized material thus obtained was placed in the crucible to bake it at 900° C. within an enclosed electric furnace. After the temperature was lowered, about log was placed in the crucible for a second time to bake it under the condition of temperature elevation of 5° C./min., arrival temperature of 1100° C., and holding time at the arrival temperature of one hour within the enclosed electric furnace. Thus, carbonaceous material was obtained.

Then, the Raman spectrum and the X-ray diffraction spectrum were measured with respect to the carbonaceous material thus obtained to determine the half width at half maximum of the peak appearing in the vicinity of 1340 cm$^{-1}$ in the Raman scattering spectrum to further implement a predetermined data processing of data obtained from the X-ray diffraction spectrum to thereby determine a ratio by weight of carbon Ps, stacking index SI, and average number of carbon layers $n_{ave}$ in a stacking structure. Moreover, the carbonaceous material thus obtained was used as an anode material to make up a coin type battery to carry out charge/discharge under the current-imposed condition of 1 mA with respect to the coin type battery thus made up to measure discharge capacity per 1 g of anode carbonaceous material.

As a result, HW, Ps,SI, $n_{ave}$ and the anode capacity of carbonaceous material were of the same order as that of the carbonaceous material of the comparative example 1. Also from the facts as described above, it has been found out that it is important that the pressure of the atmosphere is caused to be low at the time of arrival at the arrival temperature when baking carbon precursor under a low pressure atmosphere to obtain carbonaceous material.

Embodiment 6

Furfuryl alcohol resin was baked, while keeping pressure within the electric furnace at about 20 kPa, under the condition of temperature elevation of 5° C./min., arrival temperature of 1200° C., and holding time of one hour. Thus, carbonaceous material was obtained. After the carbonaceous material thus obtained was cooled, it was crushed by mill, and was split into particles less than 38 pm by mesh.

Then, the Raman spectrum and the X-ray diffraction spectrum were measured with respect to the carbonaceous material thus obtained to determine half width at half maximum of the peak appearing in the vicinity of 1340 cm$^{-1}$ in the Raman scattering spectrum to further implement a predetermined data processing of data obtained from the X-ray diffraction spectrum to thereby determine a ratio by weight of carbon Ps, stacking index SI, and average number of carbon layers $n_{ave}$ in a stacking structure. Moreover, the carbonaceous material thus obtained was used to make up a coin type battery to carry out charge/discharge under the current imposed condition of 1 mA with respect to the coin type battery thus made up to measure discharge capacity per 1 g of anode carbonaceous material. Measured results of HW, Ps, SI, $n_{ave}$ and the anode capacity are shown in Table 6.

TABLE 6

| | Ps | sI | $n_{ave}$ | HW (cm$^{-1}$) | 138 − 0.06 · T | ANODE CAPACITY (mAh/g) |
|---|---|---|---|---|---|---|
| EMBODIMENT 6 | 0.570 | 0.737 | 2.452 | 90 | 66 | 403 |

COMPARATIVE EXAMPLE 4

Carbonaceous material was manufactured similarly to the example of embodiment 6 except that the baking of furfuryl alcohol was carried out within an enclosed electric furnace.

Then, the Raman spectrum and the X-ray diffraction spectrum were measured with respect to the carbonaceous material thus obtained to determine the half width at half maximum of the peak appearing in the vicinity of 1340 cm$^{-1}$ in Roman scattering spectrum to further implement a predetermined data processing of data obtained from the X-ray diffraction spectrum to thereby determine a ratio by weight of carbon Ps, stacking index SI, and average number of carbon layers $n_{ave}$ in a stacking structure. Moreover, the carbonaceous material thus obtained was used as an anode material to make up a coin type battery to carry out charge/discharge under the current-imposed condition of 1 mA with respect to the coin type battery thus made up to measure discharge capacity per 1 g of anode carbonaceous material. Measured results of HW, Ps, SI, $n_{ave}$ and the anode capacity are shown in Table 7.

TABLE 7

| | Ps | SI | $n_{ave}$ | HW (cm$^{-1}$) | 138 − 0.06 · T | ANODE CAPACITY (mAh/g) |
|---|---|---|---|---|---|---|
| COMPARATIVE EXAMPLE 4 | 0.583 | 0.764 | 2.475 | 65 | 66 | 282 |

As seen from comparison between Tables 6 and 7, the carbonaceous material of the embodiment 6 is such that HW, Ps, SI, $n_{ave}$ satisfy the predetermined condition, and the material has an anode capacity greater than that of the carbonaceous material of the comparative example 4. On the contrary, the carbonaceous material of the comparative example 4 is such that HW, Ps, SI, $n_{ave}$ do not satisfy the predetermined condition, and the material has a smaller anode capacity.

From facts as above, it has been found out that this manufacturing method is effective also when organic material which becomes non-graphitizable carbon by baking is used as the carbon precursor similarly to petroleum pitch in which a functional group including oxygen is introduced.

What is claimed is:

1. A non-aqueous liquid electrolyte secondary battery comprising:

an anode formed of a non-graphitizable carbon material capable of doping and de-doping lithium ions;

cathode formed of a lithium-containing transition metal composite oxide as an active cathode material; and a non-aqueous liquid electrolyte;

wherein said non-graphitizable carbon material is obtained by baking a carbon precursor, wherein said non-graphitizable carbon material exhibits a portion having a stacking structure and a portion with a non-stacking structure such that a ratio (Ps) by weight of carbon in said stacking structure portion compared to said non-stacking structure portion is less than 0.59 or a stacking index (SI) of said non-graphitizable carbon material is less than 0.76.

2. The non-aqueous liquid electrolyte secondary battery as claimed in claim 1, wherein an average number of stacked layers $n_{ave}$ of the stacked layer structure portion is less than 2.46.

3. A non-aqueous liquid electrolyte secondary battery comprising:

an anode formed of a non-graphitizable carbon material capable of doping and de-doping lithium ions;

a cathode formed of an lithium-containing transition metal composite oxide as an active cathode material; and non-aqueous liquid electrolyte;

wherein said non-graphitizable carbon material is produced by baking a carbon precursor, and further wherein when:

a baking temperature is T°C., and a half width at half maximum of a peak appearing in the vicinity of 1340 cm$^{-1}$ in a Raman spectrum is HW, HW>138−0.06·T.

* * * * *